United States Patent
Klein et al.

(10) Patent No.: US 6,509,811 B2
(45) Date of Patent: Jan. 21, 2003

(54) METHOD FOR REDUCING THE EFFECTS OF SIGNAL REFLECTIONS IN A DATA COMMUNICATIONS NETWORK

(75) Inventors: Philippe Klein, La Gande (FR); Claude Gomez, Antibes (FR); Michel Verhaeghe, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 09/795,643

(22) Filed: Feb. 28, 2001

(65) Prior Publication Data

US 2002/0010873 A1 Jan. 24, 2002

(30) Foreign Application Priority Data

Feb. 29, 2000 (EP) .............................. 00480023

(51) Int. Cl.$^7$ ................................. H01P 1/18
(52) U.S. Cl. ...................................... 333/156
(58) Field of Search ................. 333/138, 156; 709/232

(56) References Cited

U.S. PATENT DOCUMENTS

| | | | | |
|---|---|---|---|---|
| 4,603,586 A | * | 8/1986 | Iida | 333/138 |
| 5,256,964 A | * | 10/1993 | Ahmed et al. | 324/158.1 |
| 5,550,875 A | * | 8/1996 | Bennett | 370/503 |
| 5,946,470 A | * | 8/1999 | Neal et al. | 235/380 |
| 6,219,384 B1 | * | 4/2001 | Kliza et al. | 327/158 |
| 6,219,733 B1 | * | 4/2001 | Appel et al. | 709/232 |

OTHER PUBLICATIONS

Matthaei et al., "Design of Microwave filters, impedance–matching networks, and coupling structures", vol. 1, Jan. 1963, pp. 38–42.*

* cited by examiner

Primary Examiner—Seungsook Ham
(74) Attorney, Agent, or Firm—Gerald R. Woods

(57) ABSTRACT

A method for adjusting the signal transmission delay in a data transmission system wherein a driver transmits high speed data to a receiver through a plurality N of transmission media connected together. The link between the driver and the receiver is composed of a plurality of N traces, the length of the trace located on each transmission medium "i" being Li with "i" being an integer comprised between 1 and N. The method consists in adding to each trace of a transmission medium "i" a delay means generating a delay ΔTi equal to:

$$\Delta Ti = Ki \cdot \frac{T0}{2} - \frac{Li}{Vi}$$

with Ki being equal to $$\frac{n_i}{N+1}$$

modulo 1, and wherein T0 is the minimum duration of a data pulse between its rising transition and its falling transition, $n_i$ is an integer equal to 1 or a number which is prime with N+1, and Vi is the propagation speed of the data signals in the trace "i".

5 Claims, 3 Drawing Sheets

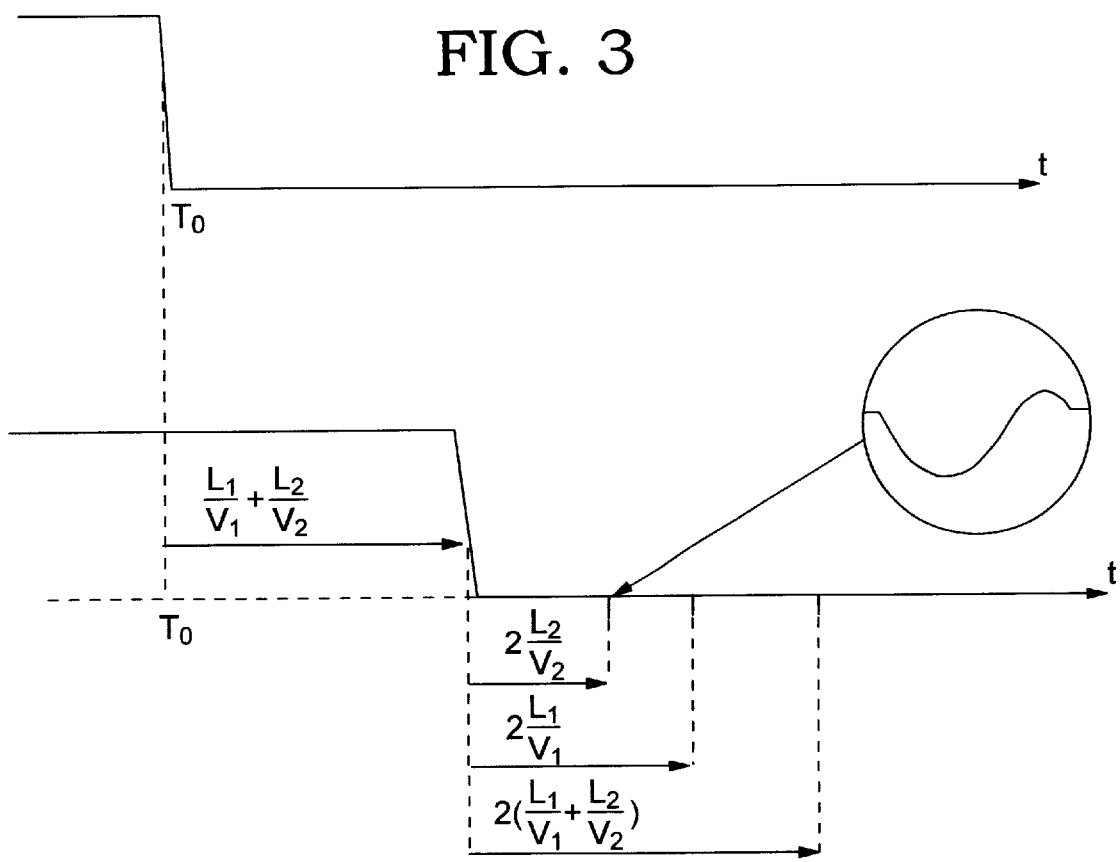
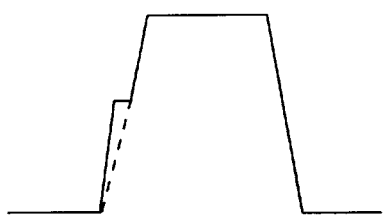
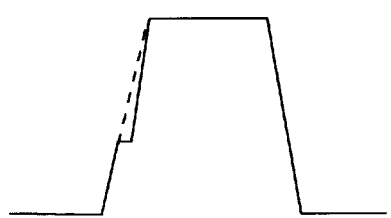
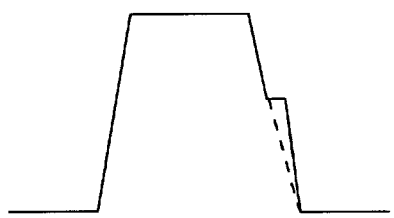
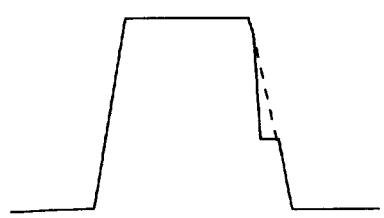

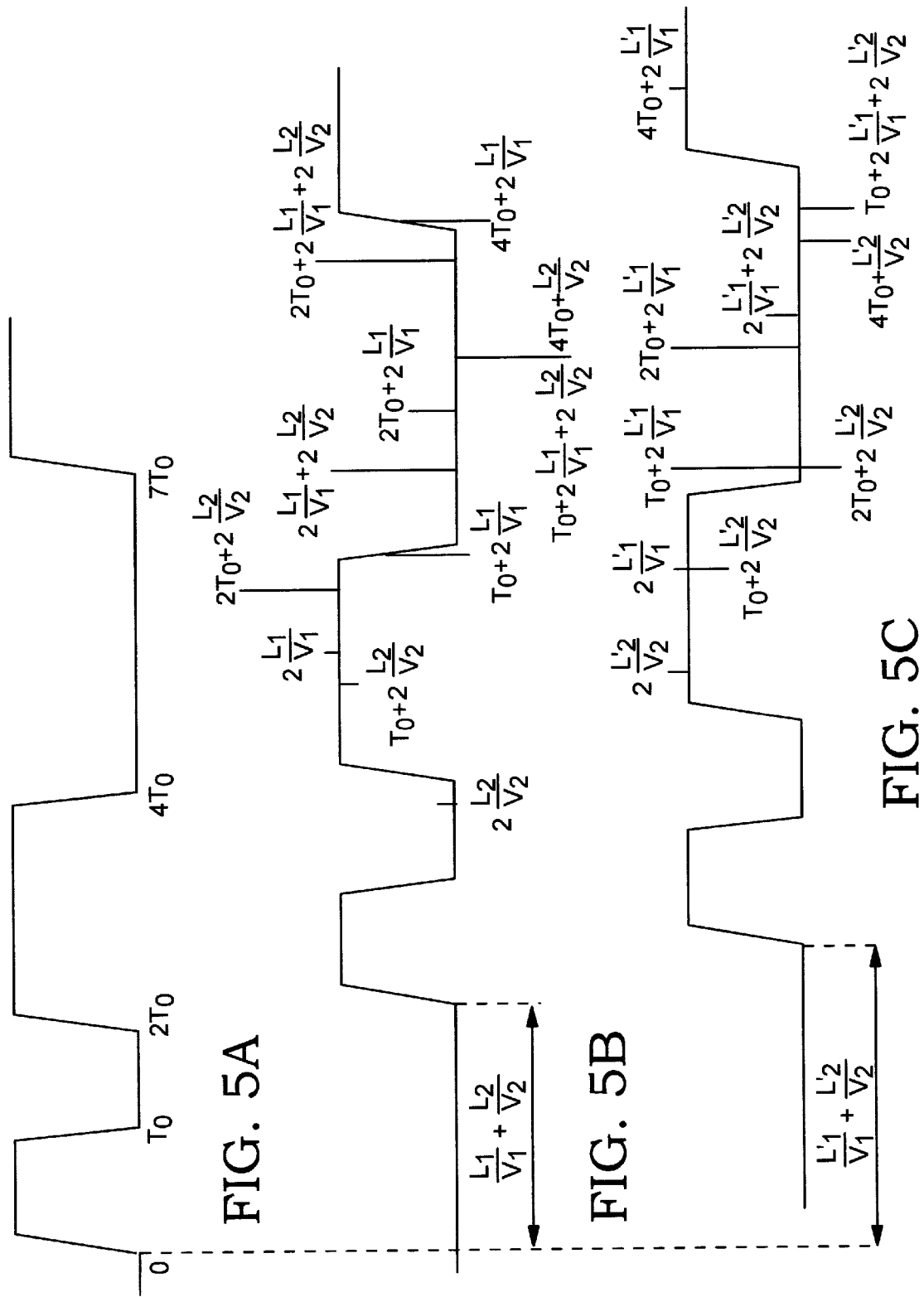

METHOD FOR REDUCING THE EFFECTS OF SIGNAL REFLECTIONS IN A DATA COMMUNICATIONS NETWORK

TECHNICAL FIELD

The invention relates to the transmission of high speed data signals in a multi-hop network and relates in particular to a method for minimizing reflection effects on data received by a receiver.

BACKGROUND

In a data communication network, data signals originating on a driver circuit board or card at a source typically reach a board or card in a destination or receiving system only after traversing a series of connections through intermediate circuit boards or transmission media.

A problem which must be solved in such networks is how to assure a high signal integrity at the receiver input. A part of the solution is to suppress as much as possible the effects of signal reflections occurring at connections on the signal path between the driver output and the receiver input.

For critical high speed systems, a partial solution can be accomplished for point to point topologies by adding a resistance at the output of the driver such that the total output resistance is equal to the characteristic impedance of the transmission media and also adding a terminating resistance at the input of the receiver such that the total impedance of the receiver is equal to the characteristic impedance. Unfortunately, even the above implementation does not completely eliminate signal reflections which degrade signal integrity at the receiver input. First, while it is possible to add resistance at components in an effort to achieve a characteristic impedance having a fixed nominal value, the actual characteristic impedance of a component may or may not be equal to the nominal characteristic impedance due to process tolerances. Assuming a nominal characteristic impedance of 50 Ω a circuit card with a tolerance of 15% may have an actual impedance as high as 57 Ω or as low as 42 Ω. Similar variations may exist for transmission media interconnecting such cards. Even though all of the components on the signal path may have the same nominal characteristic impedance, mismatches in the actual characteristic impedances can still result in signal reflections.

A possible solution to the above problem is to use only coaxial cables to connect a driver card to a receiver card since the actual characteristic impedance of such cables can be controlled to a tolerance of plus/minus 5% of nominal. This solution isn't practical except for the simplest situations. In typical networks, where the number of connections may be as high as a thousand, it becomes impossible to use coaxial cable for all of them because such cables take too much room, cost too much and take too much time to install and connect.

Another source of reflections is parasitic capacitance at the interfaces between the components on the signal path. For data transmission rates greater than 500 Mbit/s, the presented impedance for a parasitic capacitance in the range of one picofarad is on the order of 10 Ω which acts as a short-circuit for high frequencies.

SUMMARY OF THE INVENTION

The invention is a method and a system for maintaining signal integrity by enabling signal perturbations resulting from reflections in a connection between a driver and a receiver to occur at times other than the times of transitions in a received data signal.

The invention relates to a method for adjusting the signal transmission delay in a data transmission system wherein a driver transmits high speed data to a receiver through a plurality N of transmission media connected together, the link between the driver and the receiver being composed of a plurality of N elements, the length of the element located on each transmission medium "i" being Li with "i" being an integer comprised between 1 and N. The method consists in introducing into each element in a transmission medium "i" a delay $\Delta Ti$ equal to:

$$\Delta Ti = Ki \cdot \frac{T0}{2} - \frac{Li}{Vi}$$

with Ki being equal to $$\frac{n_i}{N+1}$$

modulo 1, and wherein T0 is the duration of a data pulse between its rising transition and its falling transition, $n_i$ is an integer equal to 1 or a number which is prime with N+1, and Vi being the signal propagation speed of data signals in the element.

According to a preferred embodiment of the invention, the added delay has a value $\Delta Li$ equal to:

$$\Delta Li = Vi \cdot \Delta Ti = Vi \cdot \frac{n_1}{N+1} \cdot \frac{T0}{2} - Li$$

with Vi being the propagation speed of the data signals in the transmission medium "i".

BRIEF DESCRIPTION OF THE DRAWINGS

The above and other objects, features and advantages of the invention will be better understood by reading the following detailed description of the invention in conjunction with the accompanying drawings wherein:

FIG. 3 is a representation of a diagram showing the reflections occurred at the input of the receiver when a falling transition is transmitted from the driver;

FIGS. 4A to 4D represent pulses wherein either the rising transition or the falling transition is modified by a reflection due to a rising or a falling transition transmitted from the driver; and FIGS. 5A, 5B and 5C represent respectively a diagram of a data bit signal at the output of driver, the resulting incident signal modified by reflections at the input of the receiver when the invention is not applied and the same signal at the input of the receiver when the invention is applied.

DETAILED DESCRIPTION OF THE INVENTION

Figure 1:
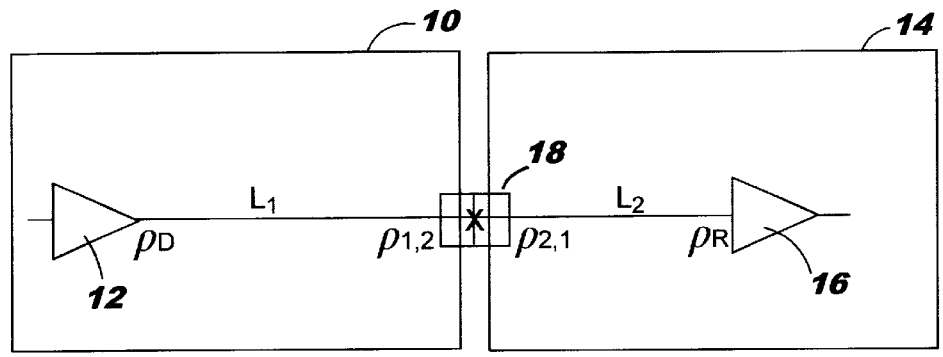
FIG. 1 represents a simple system of a first card including a driver interconnected to a second card including a receiver.

In reference to FIG. 1, a first card 10 including a driver 12 is directly connected to a second card 14 including a receiver 16 by means of connector 18. The length of the trace (that is, the signal transmission time) between driver 12 and connector 18 is L1 whereas the length of the trace between connector 18 and receiver 16 is L2.

The driver output is characterized by its output impedance which is a parallel combination of an output resistance and an output capacitance. For better signal integrity, the output resistance is as much as possible made equal to the characteristic impedance of the transmission media. Assuming that Z0 is the nominal value of the characteristic impedance of the system to be designed, the driver output resistance should have its value equal to Z0.

However, for high speed data, the rate of which is greater than 500 Mbits/s, the actual output impedance of the driver cannot be equal to Z0, due to process dispersion of the active device and due to the parasitic output capacitance associated to the packaging and card attachment.

The actual output impedance has a complex expression Zd. If the driver is connected to a transmission medium with a characteristic impedance of Z1, not identical to Zd, a part of the signal will be reflected back. The driver coefficient of reflection is:

$$\rho_D = \frac{Zd - Z1}{Zd + Z1}$$

A second impedance mismatch occurs at the interface between the two cards with connector 18. In fact, the manufacturer can provide only media with a characteristic impedance Z0 within a given tolerance, usually in the range of 10% to 15%. Furthermore, the connection between the two cards is performed by connectors which have also a given tolerance. The assembly requires the connector pins to be plugged into metallized holes which add parasitic capacitance at the interface. The card borders on each side of connector 18 are therefore sources of reflections. Thus, the coefficient of reflection for the incident signal from card 10 to card 14 is $\rho1,2$ whereas the coefficient of reflection for the reflected signal from card 14 to card 10 is $\rho2,1$.

A third impedance mismatch exists also at the input of receiver 16. The best way to solve this problem is to connect a resistance as close as possible to the receiver input, the nominal value of which is Z0. This resistance together with the input capacitance of the receiver exhibits an imaginary impedance which depends on the signal frequency. The actual input impedance has a complex expression ZR. Assuming that the characteristic impedance of the second transmission medium on card 14 is Z2, the coefficient of reflection is:

$$\rho_R = \frac{ZR - Z2}{ZR + Z2}$$

Figure 2:
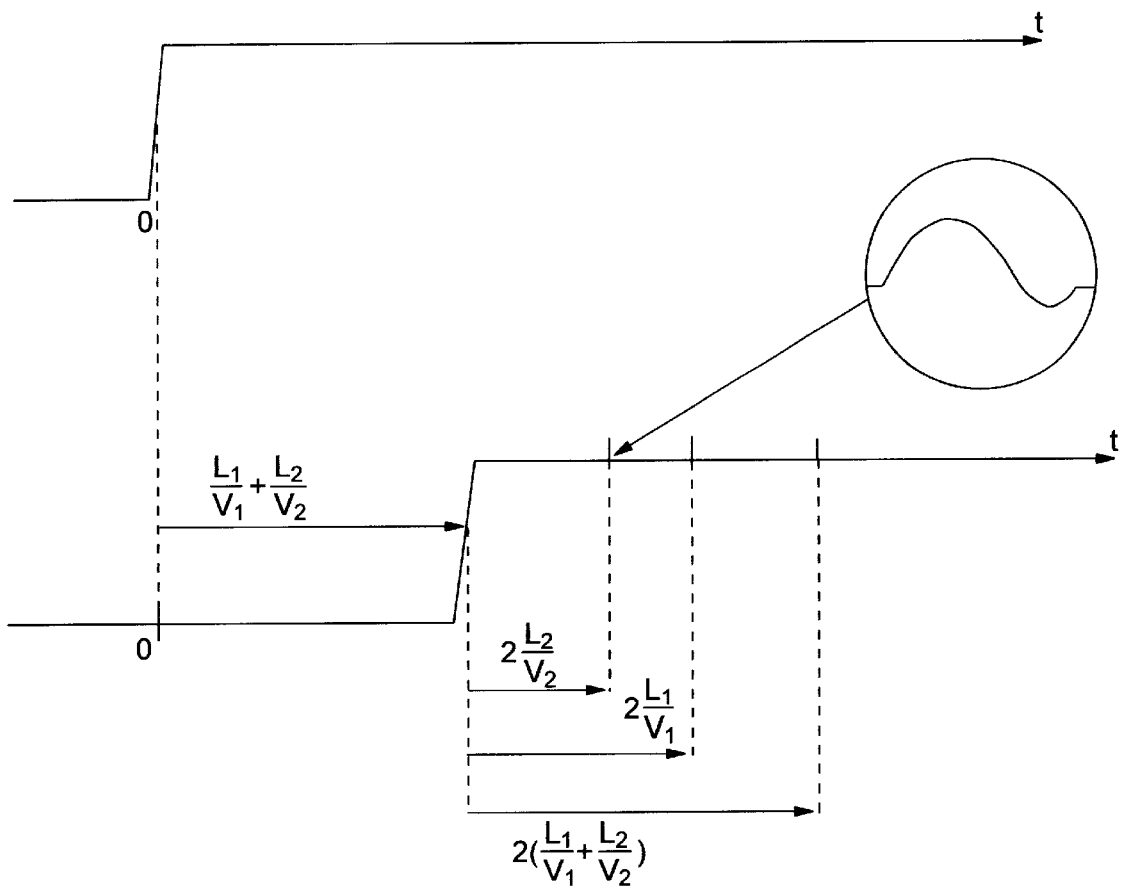
FIG. 2 is a representation of a diagram showing the reflections occurred at the input of the receiver when a rising transition is transmitted from the driver.

With a rising transition of a data pulse occurring at time 0 at the driver output, the arrival time of such a transition at the receiver input is at:

$$t = \frac{L1}{V1} + \frac{L2}{V2}$$

as illustrated in FIG. 2 with V1 being the signal propagation speed in the first card 10 and V2 being the signal propagation speed in the second card 14. It must be noted that the propagation speed meets tight tolerances, typically less than a few percent.

As already mentioned, there are several reflections produced in the link between driver 12 and receiver 16. First of all, the incident signal can be reflected by connector 18 using the coefficient of reflection $\rho1,2$, and the reflected signal is then reflected by driver 12 using the coefficient of reflection $\rho_D$. This first dual reflection arrives at the receiver input with a delay of $$\frac{2L1}{V1}$$

after the arrival time of the incident signal.

A second reflection is due to the receiver using the coefficient of reflection $\rho R$. A part of this reflected signal is reflected first by connector 18 using the coefficient of reflection $\rho2,1$, and another part by driver 12 using the coefficient of reflection $\rho_D$. The first dual reflected signal arrives at the receiver input with a delay of $$\frac{2L2}{V2}$$

after the arrival time of the incident signal whereas the second dual reflected signal arrives at the receiver input with a delay of $$2\left(\frac{L1}{V1} + \frac{L2}{V2}\right).$$

As it is assumed that the length L2 is less than length L1, the time of the reflections are according to the sequence:

$$\frac{2L2}{V2}, \frac{L1}{V1}, 2\left(\frac{L1}{V1} + \frac{L2}{V2}\right).$$

As illustrated in FIG. 2 by the curve in the circle, a reflection due to a rising transition is first an increase of the signal amplitude and then a decrease of the signal amplitude.

It must be noted that other reflections occur later. But, these subsequent reflections the amplitude of which is proportional to coefficients of reflection (always less than 1) are of a second order of magnitude and not taken into account.

Referring to FIG. 3, a falling transition occurring at a time T0 (T0 being the minimum duration of a pulse between a rising transition and a falling transition), also causes reflections to be received with the same delays as in FIG. 2 after the occurrence of the incident signal at the receiver input, that is $$T0 + \frac{L1}{V1} + \frac{L2}{V2}.$$

Such reflections due to a falling transition have the shape represented within the circle and comprise a decrease of the signal amplitude followed by an increase of the signal amplitude but less important.

When the reflections represented in FIG. 2 and FIG. 3 occur outside the signal transition, they do not raise a problem. Conversely, they do cause a problem when they occur during transitions of the signal. When the reflection is due to a rising transition, the signal is modified according to the curves illustrated in FIG. 4A and FIG. 4B, whereas the signal is modified according to the curves illustrated in FIG. 4C and FIG. 4D when the reflection is due to a falling transition.

Accordingly, the result of the reflections is a time shift with respect to a predetermined threshold of the signal transition. This time shift can increase the duration of the pulse as in FIG. 4A and FIG. 4B or can reduce the duration of the pulse as in FIG. 4C and FIG. 4D. In any case, such a time shift results in data jitter which causes a performance degradation for high bandwidth systems.

Assuming that the data pattern transmitted from driver 12 is 101100011 . . . , the diagram of the signal with respect to time at the driver output is illustrated in FIG. 5A. It must be noted that signal transitions causing reflections occur at time 0, T0, 2T0, 4T0, 7T0 . . . with T0 being the pulse duration between a rising transition and a falling transition of a bit 1. As represented in FIG. 5B, the incident signal arrives at the input of receiver 16 with a delay of $$\frac{L1}{V1} + \frac{L2}{V2}$$

due to the propagation time through the transmission media. After some time which is the time for the first reflected signal to reach the receiver, the incident signal is modified by reflections which are represented by bold strokes in FIG. 5B. These reflections, which can be positive (due to rising transitions) or negative (due to falling transitions), are added algebraically to the incident signal. They may occur at the same time resulting either in twice the amplitude of a single reflection or the inhibition of the reflections. The reflections, peaks or dips, occurring in a flat portion of the signal are minor problem since they are not in the threshold area of the receiver. But a reflection occurring in the middle of a rising or a falling transition has a severe impact as mentioned above.

Note that the arrival times of the reflections which are written on the diagram of FIG. 5B are the following:

$$\frac{2L2}{V2}, T0 + \frac{2L2}{V2}, \frac{2L1}{V1}, 2T0 + \frac{2L2}{V2}, T0 + \frac{2L1}{V1}, \frac{2L1}{V1} + \frac{2L2}{V2},$$
$$2T0 + \frac{2L1}{V1}, T0 + \frac{2L1}{V1} + \frac{2L2}{V2}, 20T + \frac{2L1}{V1} + \frac{2L2}{V2}, 4T0 + \frac{2L1}{V1}, \ldots$$

They are relative times computed from the arrival time at the receiver input of the incident signal, that is after the delay of $$\frac{L1}{V1} + \frac{L2}{V2}.$$

As it is shown, all the reflections occur in the flat portion except the reflections $$T0 + \frac{2L1}{V1}$$

and $$4T0 + \frac{2L1}{V1}$$

which occur during transitions of the signal.

Therefore, the principle of the invention is to adjust the traces so that the reflections no longer occur during a rising or a falling transition. The signal in each trace is delayed so that the propagation time of each reflected signal does not correspond to a multiple of the period T0. In other words, the delay added in each trace must cause any reflection to occur at a point within a period T0 and never during the transition.

Accordingly, the delay generated by the delay means added in a trace corresponding to a transmission medium "i" must be $$\Delta Ti = Ki \cdot \frac{T0}{2} - \frac{Li}{Vi}$$

with Ki being equal to $$\frac{n}{N+1}$$

modulo 1 wherein N is the number of transmission media and $n_i$ is an integer equal to 1 or to a number which is prime with N+1.

This means that the duration for a reflected signal resulting from two reflections to be propagated two times in the trace is $$2\Delta Ti + \frac{2Li}{V_i} = KiT0 = T0 \cdot \frac{n_1}{N+1} \quad \text{(modulo 1)}$$

and therefore the arrival time of the reflection at the input of the receiver cannot occur during a transition of the incident signal.

For the reflections resulting from several traces, the delays are the following $$\sum \left(2\Delta Ti + \frac{2Li}{Vi}\right) = T0 \cdot \frac{1}{N+1} \sum n_i \quad \text{(modulo 1)}$$

Inasmuch as ni is equal to 1 or a number which is prime with N+1, any sum Σni will be different from N+1 and therefore the reflection will no longer occur during a transition.

Assuming that the speeds Vi have the same value V for all transmission media, the above expression becomes $$\sum \left(2\Delta Ti + \frac{2Li}{V}\right) = T0 \cdot \frac{1}{N+1} \sum n_i.$$

As it is possible to take ni=1, this expression becomes, for a reflection due to m traces, $$\sum \left(2\Delta Ti + \frac{2Li}{V}\right) = V \cdot T0 \cdot \frac{m}{N+1} \quad \text{(modulo 1)}$$

with m being between 1 and N.

The preferred embodiment consists in adding to each trace an extra trace having a length ΔLi. If Vi is the propagation speed in the transmission medium "i", its value is $$\Delta Li = Vi \cdot \Delta Ti.$$

Note that, in the embodiment, the simplest way is to make ni=1 and $$Ki = \frac{1}{N+1}$$

resulting in $$\Delta Li = Vi \cdot Ki \cdot \frac{T0}{2} - Li$$

with such an extra trace, the trace length becomes L'i=Li+ ΔLi·Accordingly, in the example of FIG. 1, the incident signal arrives at the input of receiver 16 with a delay of $$\frac{L'1}{V1} + \frac{L'2}{V2}$$

FIG. 5C represents the incident signal at the receiver input when an extra trace has been added to each trace. After some time which is the time for the first reflected signal to reach the receiver, the incident signal is modified by reflections which are represented by bold strokes. But, in contrast to the previous case illustrated in FIG. 5B, no reflection occurs during a rising or a falling transition. Thus, the two reflections which occurred during transitions in FIG. 5B that is at times $$T0 + \frac{2L1}{V1} \text{ and } 4T0 + \frac{2L1}{V1}$$

occur now at times $$T0 + \frac{2L'1}{V1} \text{ and } 4T0 + \frac{2L'1}{V1}$$

which are outside the times of transitions in the incident signal as shown in FIG. 5C.

To illustrate the preferred embodiment of the invention, it is easy to apply it to the example of FIG. 1. The extra traces for the two transmission media have therefore the following values:

$$\Delta L1 = \left(m + \frac{1}{3}\right) \cdot V1 \cdot \frac{T0}{2} - L1$$

$$\Delta L2 = \left(m' + \frac{1}{3}\right) \cdot V2 \cdot \frac{T0}{2} - L2$$

with m, m' being any integers and V1 and V2 being respectively the propagation speeds in the two transmission media. Note that m and m' could be equal to 0 provided that the values of ΔL1 and ΔL2 are always positive or equal to 0.

With the above expressions, the total extra trace for the two traces has the following value:

$$\Delta L1 + \Delta L2 = \left[\left(m + \frac{1}{3}\right) \cdot V1 + \left(m' + \frac{1}{3}\right) \cdot V2\right]\frac{T0}{2} - (L1 + L2)$$

Assuming that V1=V2=V $$\Delta L1 + \Delta L2 = \left(m + \frac{1}{3} + m' + \frac{1}{3}\right) \cdot V \cdot \frac{T0}{2} - (L1 + L2)$$

$$= \left(p + \frac{2}{3}\right) \cdot V \cdot \frac{T0}{2} - (L1 + L2)$$

with p being an integer which could be equal to 0. The above equation proves that no reflection due to the total trace can occur during a transition.

It must be noted that, since the reflection occur at times within a pulse of duration T0 which are defined by the division of this duration T0 by N+1, it is preferable that the number N of transmission media be less than 5. In such a case, N+1=6. The time difference between any reflection and a transition is only $$\frac{T0}{6}$$

which is very small with respect to the data bit period.

What is claimed is:

1. A method for adjusting the signal transmission delay in a high speed data transmission system wherein a driver (12) transmits data to a receiver through a plurality N of connected transmission media, the link between said driver and said receiver being composed of a plurality of N traces, the length of the trace at each transmission medium "i" being Li with "i" being an integer comprised between 1 and N;

said method consisting in adding to each trace of a transmission medium "i" a delay ΔTi equal to $$\Delta Ti = Ki \cdot \frac{T0}{2} - \frac{Li}{Vi}$$

with Ki being equal to $$\frac{n_i}{N+1}$$

modulo 1, and wherein T0 is the minimum duration of a data pulse between its rising transition and its falling transition, $n_i$ is an integer equal to 1 or a number which is prime with N+1, and Vi is the propagation speed of the data signals in said trace of said transmission medium "i".

2. A method according to claim 1, wherein the delay added to each trace has a length ΔLi equal to $$\Delta Li = Vi \cdot \Delta Ti - Li$$

with Vi being the propagation speed of the data signals in said transmission medium "i".

3. A method according to claim 2, wherein $$Ki = \frac{1}{N+1}.$$

4. A method according to claim 3, wherein the propagation speed of the data signals is the same for all said transmission media.

5. A method according to claim 4, wherein said plurality N of transmission media is less than or equal to 5.

* * * * *